United States Patent [19]

Fischer et al.

[11] Patent Number: 4,475,383

[45] Date of Patent: Oct. 9, 1984

[54] METHOD AND APPARATUS FOR TESTING VEHICULAR WHEELS

[75] Inventors: Gerhard Fischer, Darmstadt; Vatroslav Grubisic, Rheinheim, both of Fed. Rep. of Germany

[73] Assignee: Fraunhofer-Gesellschaft zur Foerderung der angewandten Forschung e.V., Munich, Fed. Rep. of Germany

[21] Appl. No.: 343,946

[22] Filed: Jan. 29, 1982

[30] Foreign Application Priority Data

Apr. 11, 1981 [DE] Fed. Rep. of Germany ....... 3114714
Sep. 28, 1981 [DE] Fed. Rep. of Germany ....... 3138573

[51] Int. Cl.³ .......................... G01L 5/16; G01M 17/02
[52] U.S. Cl. ............................................. 73/146; 73/8
[58] Field of Search ...................................... 73/146, 8

[56] References Cited

U.S. PATENT DOCUMENTS

| | | | |
|---|---|---|---|
| 2,766,618 | 10/1956 | Stiehler | 73/146 |
| 3,060,734 | 10/1962 | Obarski et al. | 73/146 |
| 3,527,091 | 9/1970 | Reus | 73/146 |
| 3,546,936 | 12/1970 | Tarpinian | 73/146 |
| 4,160,378 | 7/1979 | Himmler | 73/146 |

Primary Examiner—Donald O. Woodiel
Attorney, Agent, or Firm—Murray Schaffer

[57] ABSTRACT

An apparatus for testing vehicle wheels with tires and wheel hubs. A frame has an axle supporting a wheel. An annular wheel contact member surrounds the wheel and is engaged by the wheel in surface-to-surface contact. The frame is loaded by a variable or constant load to cause deflection of the axle which supports the wheel. The force condition imposed on the frame thus arises as a reaction force at the wheel when it is deflected into engagement with the wheel contact member. A drive means rotates the wheel contact member while the wheel is forceably engaged with the wheel contact member to simulate operating conditions. The apparatus can also be used to test two wheels in tandem arrangement, as well as for individual component testing of the wheel hub, hub bearings and wheel bolts.

18 Claims, 9 Drawing Figures

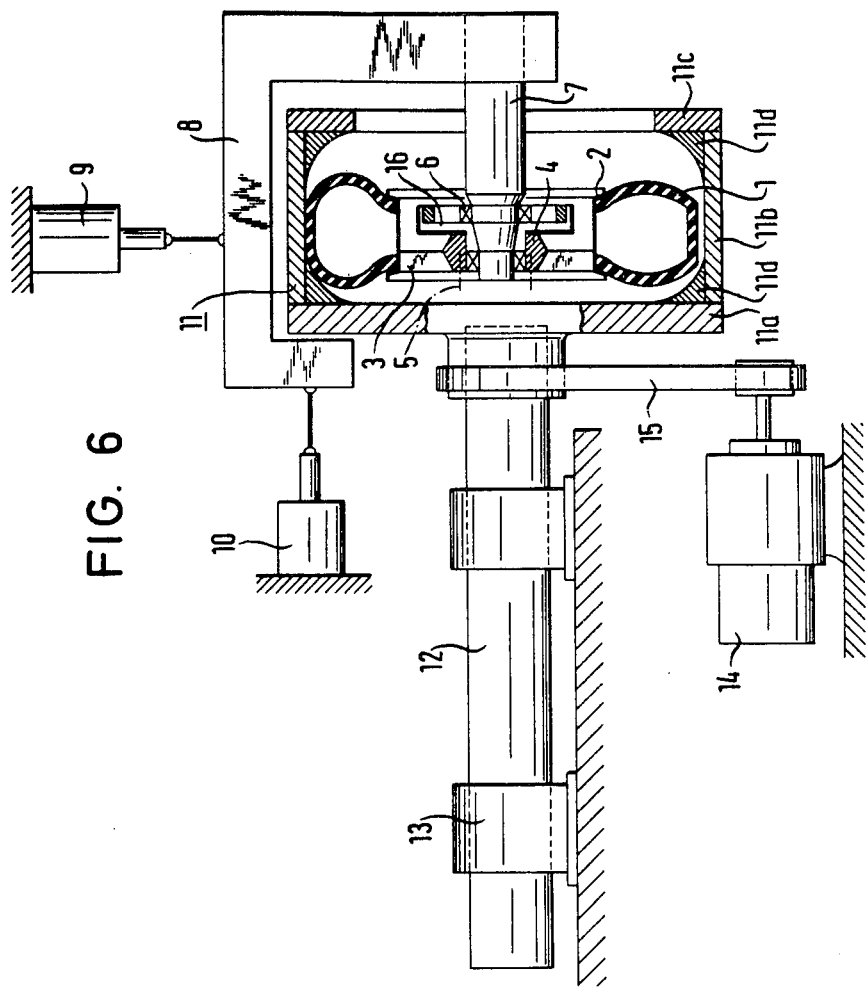

METHOD AND APPARATUS FOR TESTING VEHICULAR WHEELS

BACKGROUND OF THE INVENTION

This invention relates to apparatus for testing the performance of wheels, wheel hubs and hub bearings of vehicles, and more particularly to a test apparatus that imposes a variable or constant load condition on the items being tested that is generally equivalent to the load condition produced during actual road operation.

One well known method for testing a vehicle wheel comprising a tire mounted on a rim, is the rolling test wherein the tire is supported on or against the convex surface of a large diameter drum. During rotation of the wheel against the drum, a load applied to the wheel by the drum causes a reaction force to develop on the tire. The applied load is generally perpendicular to the axis of rotation of the wheel, i.e., a radially directed force, and, in certain instances, a lateral, or axially directed force, generally parallel to the axis of rotation, can also be generated by the drum.

The amount of force imposed on the wheel during the rolling test is normally limited by the strength of the tire. Therefore, it is usually inadvisable to overload the wheel with the intention of shortening the test time because such overload can lead to premature tire failure. In addition, the overload generally does not provide test results that can be correlated with test results under normal load conditions and is therefore an unreliable test mode.

Heat buildup in the tire under the rolling test is generally accompanied by a decline in lateral forces imposed due to a reduction in the coefficient of friction. It is, thus, difficult to maintain constant test conditions during a rolling test. In addition, tire tread wear is often so extensive during the rolling test, that several tires may be required during one type of test. As a result, the rolling test is costly to perform, requires substantial amounts of time to provide usuable test results, and has only a limited range of testing possibilities.

It is, thus, desirable to provide a test apparatus for wheels, wheel hubs, hub bearings and wheel bolts that will not cause premature tire failure under overload conditions, will not cause extensive heat buildup in the tire and offers a variety of loading possibilities to reproduce force conditions equivalent to those generated during actual road operation.

Among the several objects of the invention may be noted the provision of a novel test apparatus for a wheel, a novel test apparatus for a wheel that permits application of any desired load conditions that correspond to wheel forces occurring in actual operation, a novel test apparatus for a wheel that permits overloading of the wheel without causing significant tire wear or premature tire failure, a novel test apparatus for a wheel that permits application of axially directed forces independent of radially directed forces, a novel test apparatus for a wheel that permits testing of rims, wheel hubs, hub bearings and wheel bolts under conditions resembling actual operation, and a novel test apparatus that permits testing of wheels in tandem arrangement under unequal load conditions that substantially duplicate actual operation.

Other objects and features will be in part apparent, and in part, pointed out hereinafter.

SUMMARY OF THE INVENTION

The present invention relates to a novel test apparatus for wheels, wheel hubs, hub bearings and wheel bolts that permits imposition of a predetermined variable or constant load over a greater peripheral surface of the tire than the relatively small contact area developed by known roll and test apparatus.

In one embodiment of the invention, the test apparatus comprises a frame for rotatably supporting the wheel on an axle. An annular cylindrical wheel contact member surrounds the wheel and has an inner peripheral surface diameter that is equal to or is slightly greater than the outer tire diameter of the wheel. Force imposing means for deflecting the frame to impose a load on the wheel include a first hydraulic cylinder that is, for example, a servo-actuatable to impose a force on the frame in a vertical direction, and a second hydraulic cylinder that is independently servo-actuatable to impose a force on the frame in a lateral direction.

The frame is deflected in a predetermined fashion, in response to such forces, to slightly deflect the axle from its normal unloaded position, and thereby cause engagement between the tire and the wheel contact member. Such engagement causes a reaction force to arise at the tire in response to the forces imposed on the frame. The wheel contact device is rotatable at predetermined speed thereby simulating movement of the tire under load conditions that resemble those of actual operation. Wheel hubs, wheel bearings and wheel bolts can also be tested under any selected loading condition.

In another embodiment of the invention, the apparatus has provision for testing two wheels in tandem arrangement under unequal stress conditions resembling those of actual operation as found in tandem wheel arrangements in trucks.

In still another embodiment of the invention, the wheel and tire combination is interchanged with a substitute wheel construction that omits a tire but is sufficiently enlarged to make direct surface contact with the wheel contact device.

Full details of the present invention are described hereinafter and illustrated in the accompanying drawings.

BRIEF DESCRIPTION OF THE DRAWINGS

In the accompanying drawings, in which various embodiments of the invention are illustrated.

FIGS. 6, 7 and 8 are schematic side views, partially shown in section of other embodiments of the invention.

DESCRIPTION OF THE INVENTION

Figure 1:
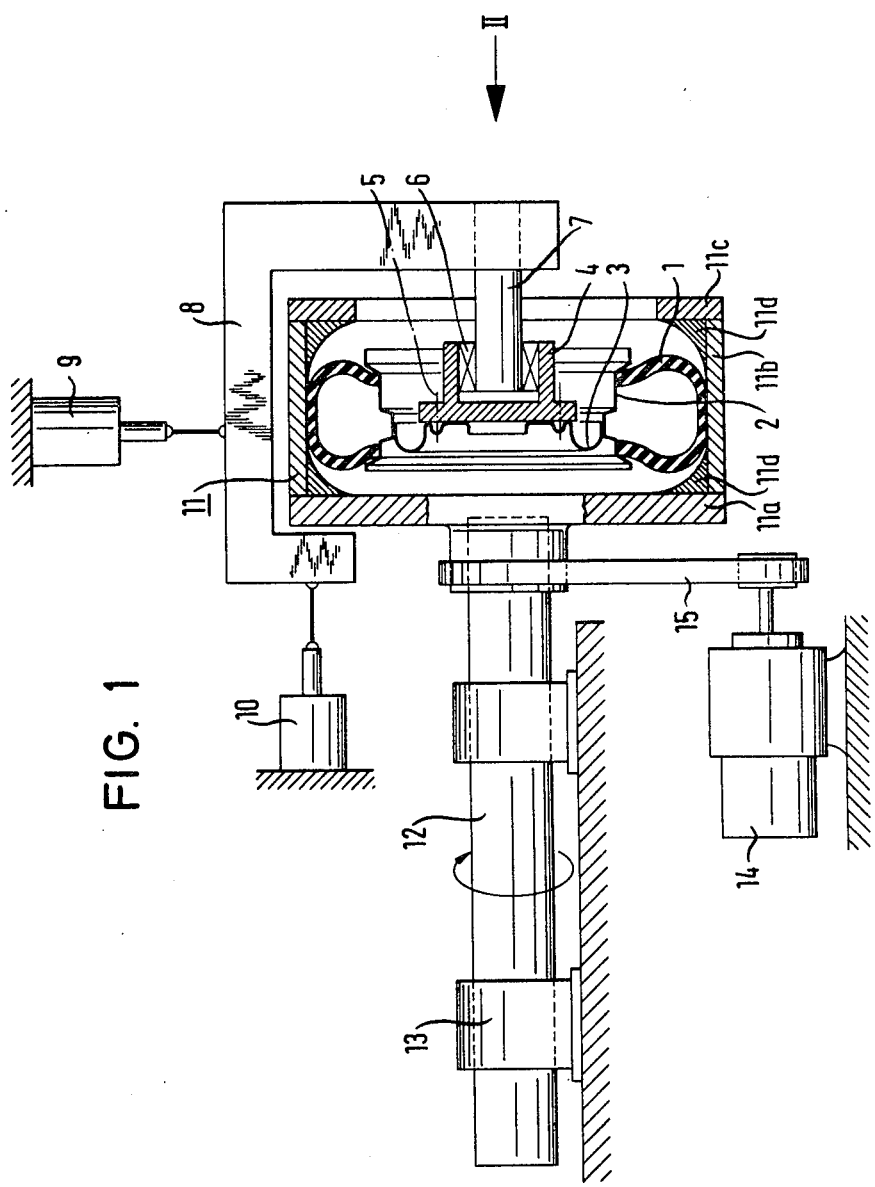
FIG. 1 is a schematic side view, partially shown in section, of a test apparatus incorporating one embodiment of the invention.

Corresponding reference characters indicate corresponding parts throughout the several views of the drawings.

Figure 2:
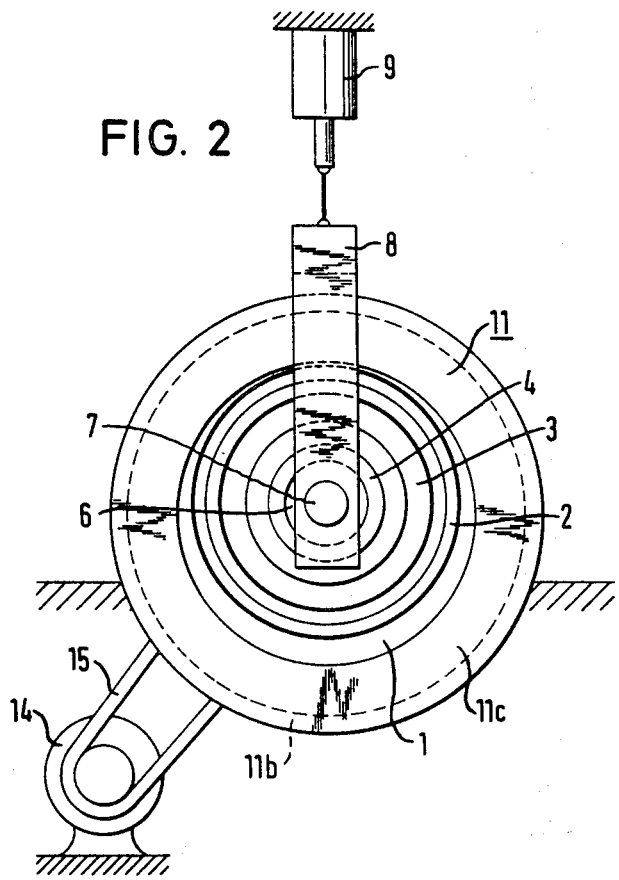
FIG. 2 is a front view thereof.

Referring to the drawings, especially FIGS. 1 and 2, a tire 1 inflated to an nominal air pressure is mounted on a rim 2 and a disc 3, the combination of rim, disc, and tire being referred to broadly as the wheel although in practice, the rim 2 and disc 3 is specifically the wheel. The test apparatus which accommodates the tire 1 includes a wheel hub 4 to which the disc 3 may be secured by wheel bolts schematically indicated at 5. The wheel hub 4 can be an original hub incorporating the original vehicle bearings when the hub and/or vehicles bearings are to be tested along with the wheel or tire. If desired, the hub 4 can be oversized as when only the wheel is to be tested. Wheel bearings 6 rotatably support the hub 4 on an axle journal 7, which transfers quasi-static forces to the rotating wheel. The original axle journal 7 is used when the wheel hub 4 and wheel bearings 6 are being tested. If desired, oversized wheel bearings can be used when only the wheel is to be tested.

A loading device 8 for imposing selected vertical forces that are radially directed toward the axis of rotation of the wheel, and lateral forces that are directed parallel to the axis of rotation of the wheel is affixed to the axle journal 7. The loading device 8, in response to such vertical and lateral forces is deflected in predetermined fashion to slightly deflect the axle journal 7 from its normal unloaded position.

A servo-controlled hydraulic cylinder 9 introduces a selected constant or variable vertical force onto the loading device 8, whereas a servo-controlled hydraulic cylinder 10 introduces a selected constant or variable lateral force to the loading device 8. The hydraulic cylinders 9 and 10 can also be used to support the loading device 8 as most clearly shown in FIG. 7.

A wheel contact device 11 includes a circular base portion 11a, a cylindrical drum portion 11b, an annular cover portion 11c and a pair of annular contact rings 11d. The contact rings are tapered on the sides facing the tire, and are fixedly attached to the drum. The loading device 8, upon being deflected by the vertical and lateral forces, applies such forces through the axle journal 7 to the wheel disc 3, the wheel bearings 6, the wheel hub 4 and the wheel bolts 5 to establish a reaction force at the tire 1 where it contacts the wheel contact device 11 due to the deflection of the axle journal 7. Thus, the vertical and lateral forces applied to the loading device 8 arise as reaction forces at the tire 1 on the cylindrical drum 11b and the pair of contact rings 11d. The inside diameter of the cylinder 11b is preferably equal to or slightly larger than the outside diameter of the tire 1 when the tire is uninflated such that any slight deflections of the axle journal 7 produces a responsive engagement between the tire 1 and the cylindrical drum portion 11b of the wheel contact device 11.

A drive shaft 12 affixed to the base portion 11a of the wheel contact device 11 is supported for rotation in bearings 13 which also receive the reaction forces of the tire 1. A drive motor 14, drives the shaft 12 by means of a V-belt 15, which in turn rotates the wheel contact device 11 and the wheel including the tire 1. The motor 14 also functions as a brake.

During operation of the test apparatus to test tires, wheels, hubs, bearings and wheel bolts under conditions resembling those of actual operation, forces imposed on the tire 1 and transmitted to the wheel components result from any combination of vertical forces (F) (arising from traction between the tire and the road) lateral forces, ($F_h$) (arising from turning the vehicle and/or sideway movement) longitudinal forces (motive and breaking forces) ($F_l$).

Figure 3:
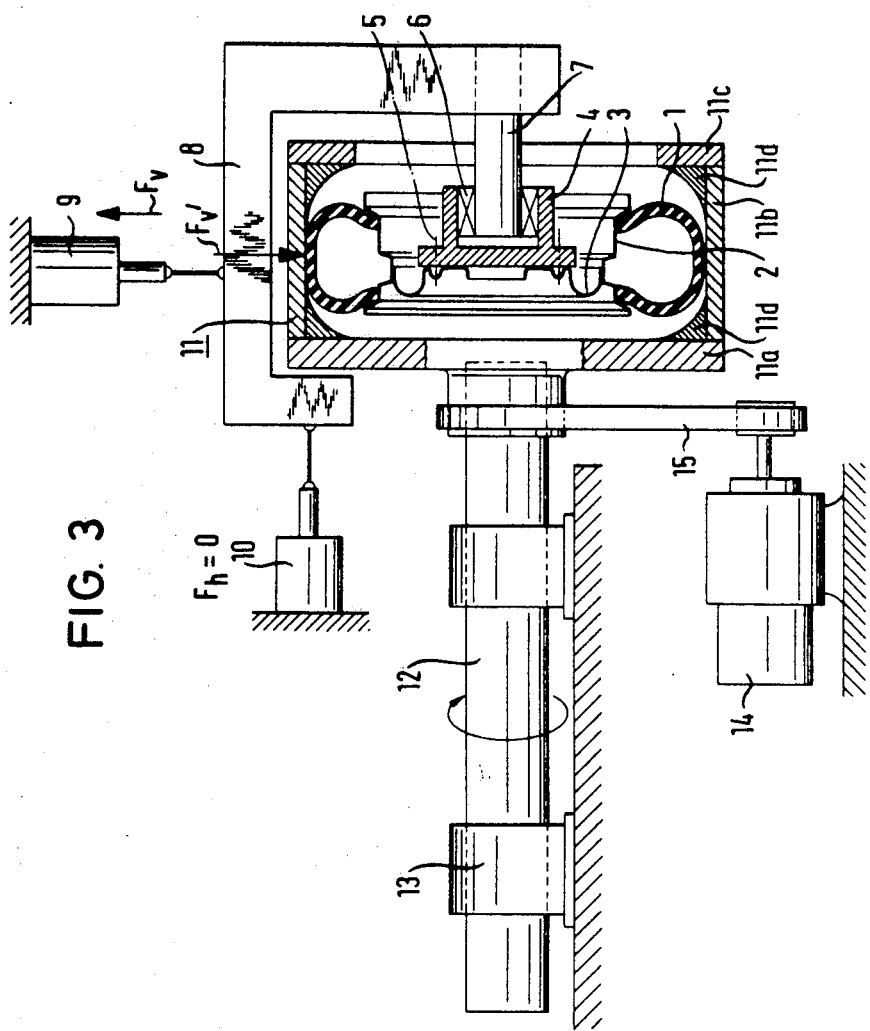
FIG. 3 is a view similar to FIG. 1 showing the direction of application of a vertical force imposed by the apparatus upon a wheel and the reaction force of the wheel.

Vertical forces ($F_v$) are generally positive but may be sometime negative as a result of an opposite force in reaction to the traction condition. The positive vertical forces ($+F_v$) usually arise while normally driving a vehicle as on a substantially straight course as a result of traction between tire and road. The magnitude of such forces depends upon the weight of the vehicles and whether the road conditions are smooth, bumpy, cracked, potholed, icy or include railroad crossings for example, as well as the speed of operation. Vertical reaction forces ($-F_v$) (FIG. 3) are imposed on the wheel when a tractive force is imposed, for example, on the loading device 8 by the cylinder 9. The contact between the tire 1 and the wheel contact device 11 causes a flattening or depression of the top of the tire 1 against the wheel contact device 11 at the top of the cylindrical drum 11b. Consequently, a gap forms between the tire 1 and the bottom of the cylindrical drum 11b at the opposite peripheral surface of the tire 1 approximately 180° away from the contact surface. The gap is variable in response to changes in the tire as a result of the forces applied to it. Accordingly, the rim 2 and disc 3 in responding to the force of the cylindrical drum portion 11b of the wheel contact device 11 against the tire 1 furnishes an equal and opposite force to the tire 1.

A purely vertical traction force ($F_v'$) is generated in the wheel through the axis of the wheel. Although not shown, any suitable arrangement can be used for adjusting the application of the tractive force ($F_v$) to pass through the axis of the rim for any tire width.

Lateral forces usually arise while driving a vehicle around a curve. The curve side wheel or radially inner wheel with respect to the center of the curve, receives a positive force ($+F_h$) directed towards the center of the vehicle while the outside wheel receives negative force ($-F_h$) away from the center. Lateral forces can also result when driving on a straight course over rough roads that include potholes, for example. In this instance, the lateral force may be directed on either side of the vehicle both toward the center of the vehicle ($+F_h$) and also towards the outside of the vehicle ($-F_h$). It should be noted that during operation of a vehicle, lateral forces can only arise in combination with vertical forces.

Figure 4:
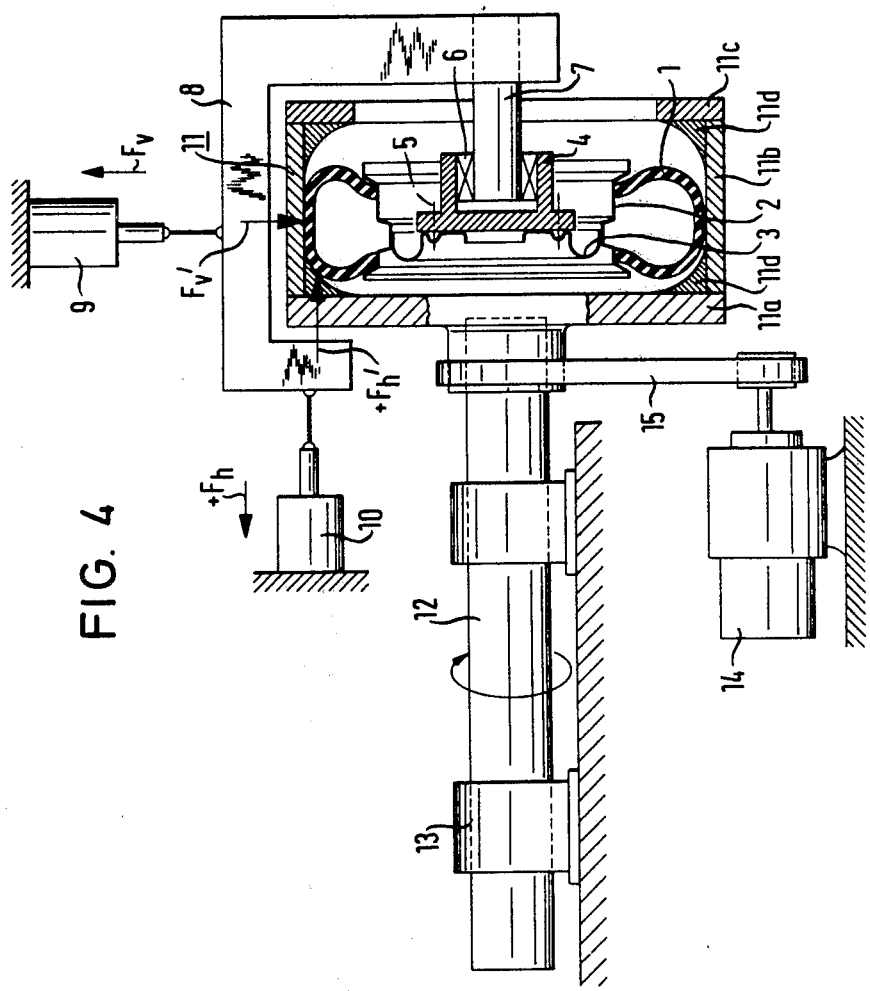
FIG. 4 is a view similar to FIG. 1 showing the direction of application of a vertical force and a positive lateral or horizontal force imposed by the apparatus upon a wheel and the reaction forces of the wheel.

A lateral force is imposed on the tire 1 in the test apparatus by the cylinder 10 acting upon the loading device 8. For example, as shown in FIG. 4, a positive lateral force ($+F_h'$) is generated in combination with a predetermined vertical force ($F_V'$) by actuating the cylinder 10 to cause the left flank of the tire 1 to contact the inside (left) contact ring 11d (as clearly shown at the upper portion of the tire 1) over a limited area of the tire periphery. The magnitude of the lateral force provided can be predetermined to be consistent with lateral forces that are present during actual vehicular operation.

The longitudinal forces ($F_L$) are similar both positive ($+F_L$) during motive mode and negative ($-F_L$) during braking mode.

Figure 5:
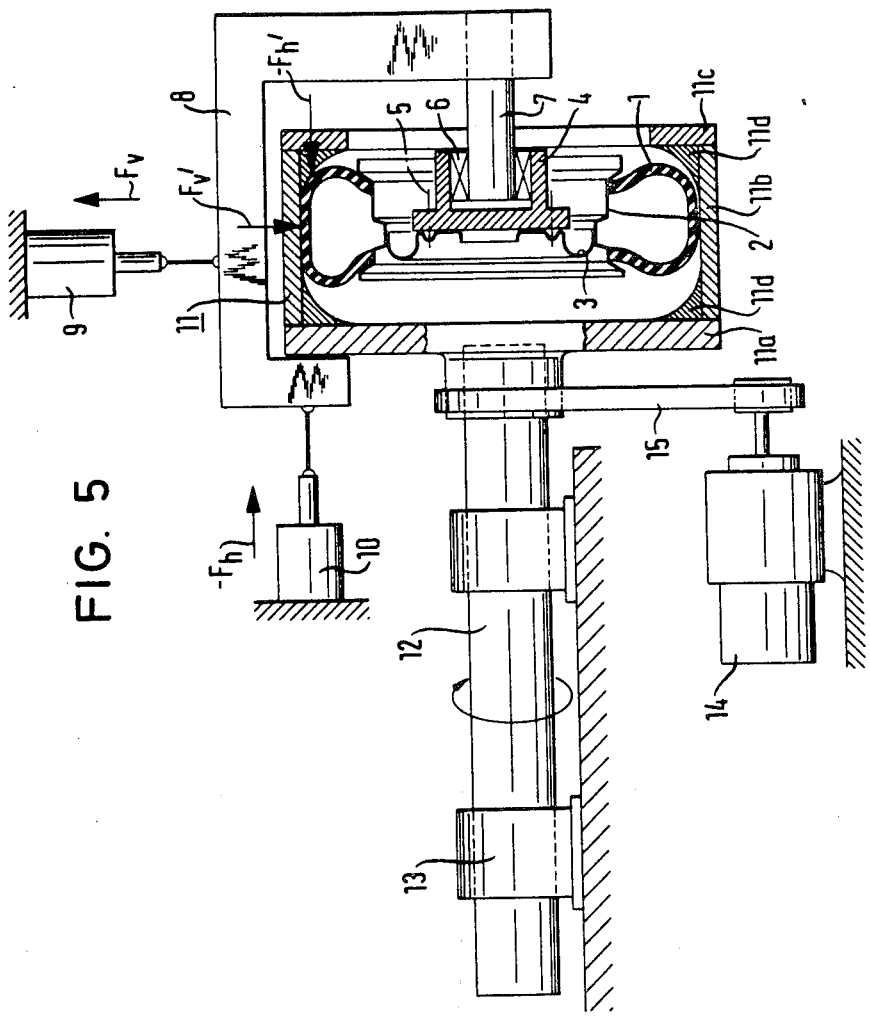
FIG. 5 is a view similar to FIG. 1 showing the direction of application of a vertical force and a negative lateral or horizontal force imposed by the apparatus upon a wheel and the reaction forces of the wheel.

As shown in FIG. 5, a negative lateral force ($-F_h'$) is generated in combination with a predetermined vertical force ($F_v'$) by actuating the cylinder 10 to cause the right flank of the tire 1 to contact the outside (right) contact ring 11d (as clearly shown at the upper portion of the tire 1). The position of the contact rings 11d in the drum portion 11b can be adjusted to correspond with any selected tire ridge or flank as by arranging the contact rings 11d to shift laterally in one direction or another. Lateral shifting of the contact rings 11d in any suitable known manner may also be desirable because of the limited displacement capability of the cylinder 10.

Since the hydraulic cylinders 9 and 10 are controlled independently of each other, any desired load combination of vertical force ($F_v'$) positive or negative lateral forces and longitudinal force ($\pm F_L$) ($\pm F_h$) can be selected. The test apparatus can thus simulate any load and road conditions existing in actual vehicular operation.

Referring to FIGS. 1 and 2, the wheel can be removed from the test apparatus by disconnecting the hydraulic cylinders 9 and 10 from the loading device 8. The cover portion 11c is removed from the drum portion 11b by unscrewing the fastening screws (not shown) and removing the accessible contact ring 11d. The loading device 8 and axle journal 7 can also be disconnected and removed by removing attachment screws (not shown). This permits removal of the rim 2, and the disc 3 and the tire 1 from the wheel contact device 11. Removal of the wheel bolts 5 from the rim 2 and the disc 3 permits separation thereof from the wheel hub 4. A reversal of this sequence is used to mount the wheel in the test apparatus.

Another feature of the test apparatus is its ability to test a wheel such as a motorcyle wheel or a spoke wheel for trucks, for its capability of withstanding longitudinal forces generated during start of acceleration as well as during braking operations. As shown in FIG. 6, a wheel brake 16, such as a drum or a disc brake, is attached to the wheel hub 4 to accomplish the brake test. The moment of inertia of the wheel contact device 11 and the drive moment of the drive motor 14 also provide a fly wheel effect for simulating a desired longitudinal force. It can be appreciated that because of the greater contact area between the tire 1 and concave surface of the cylindrical drum 11b, greater braking forces can be transferred to the wheel than are possible in an actual road test situation or in a rolling drum test which provide point or axial line contact between a tire and a convex drum surface.

Figure 7A:
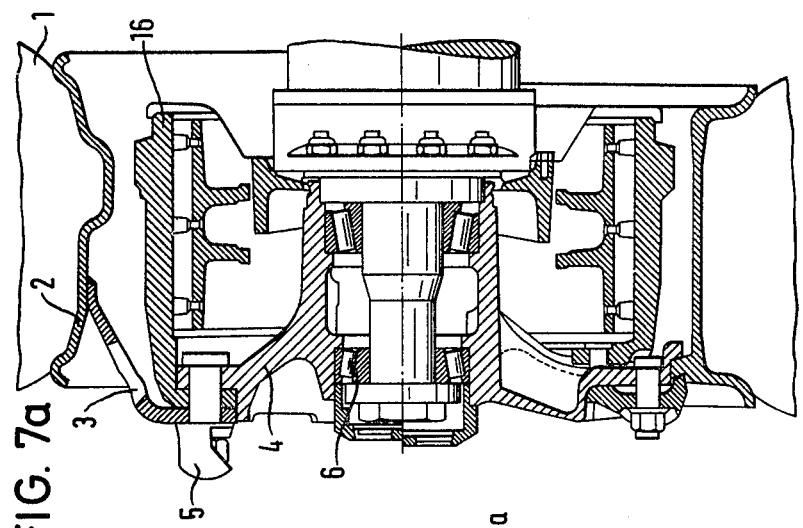
FIG. 7a is an enlarged fragmentary view, partially shown in section, of a further embodiment of the invention for testing the front wheel assembly of a truck.
Figure 7:
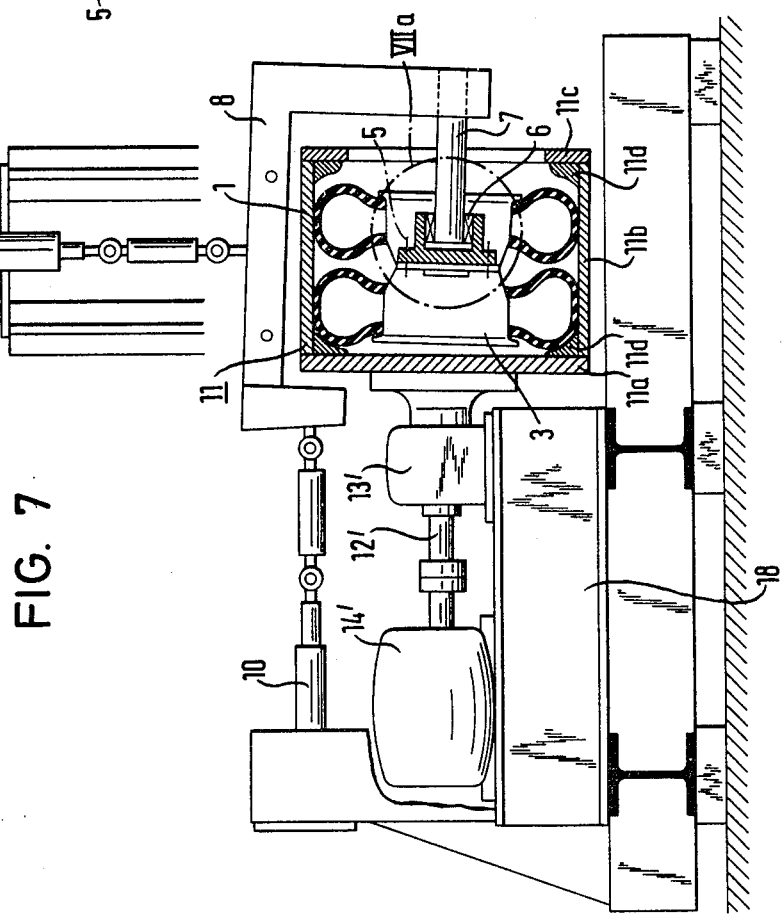

Another test mode is shown in FIG. 7, which is essentially structured and operates in the manner described for FIGS. 1 and 2, although the test apparatus is set up for testing truck wheels in single or dual arrangement. In this embodiment, the drum 11 is enlarged axially, to accommodate the width of two wheels, and the motor 14' and the bearing 13', supporting the drum drive shaft 12' are enlarged to sustain the greater load and arranged generally coaxial with hubs 3, on an elevated base 18. Each wheel includes a hub 4 secured together in side by side arrangement, upon which the respective wheels rotate. FIG. 7a is an enlarged fragmentary view of a truck rim showing the bolts 14 that permit side by side secureness of the respective wheel hubs 4. Accordingly, the FIG. 7 apparatus is similarly capable of furnishing the vertical wheel forces ($F_v$) of FIGS. 3 and 4, the lateral wheel forces of FIGS. 4 and 5, and the longitudinal wheel forces, due to braking, of FIG. 6. Thus, the irregular loads withstood by dual or tandem wheels, as in driving on a banked or cambered road surface, which can cause greater wheel forces on the inside wheel than the outside wheel, can be simulated by imposing an eccentric vertical force ($F_v$) at the cylinder 9, tilting the axle 7 from the horizontal.

Figure 8:
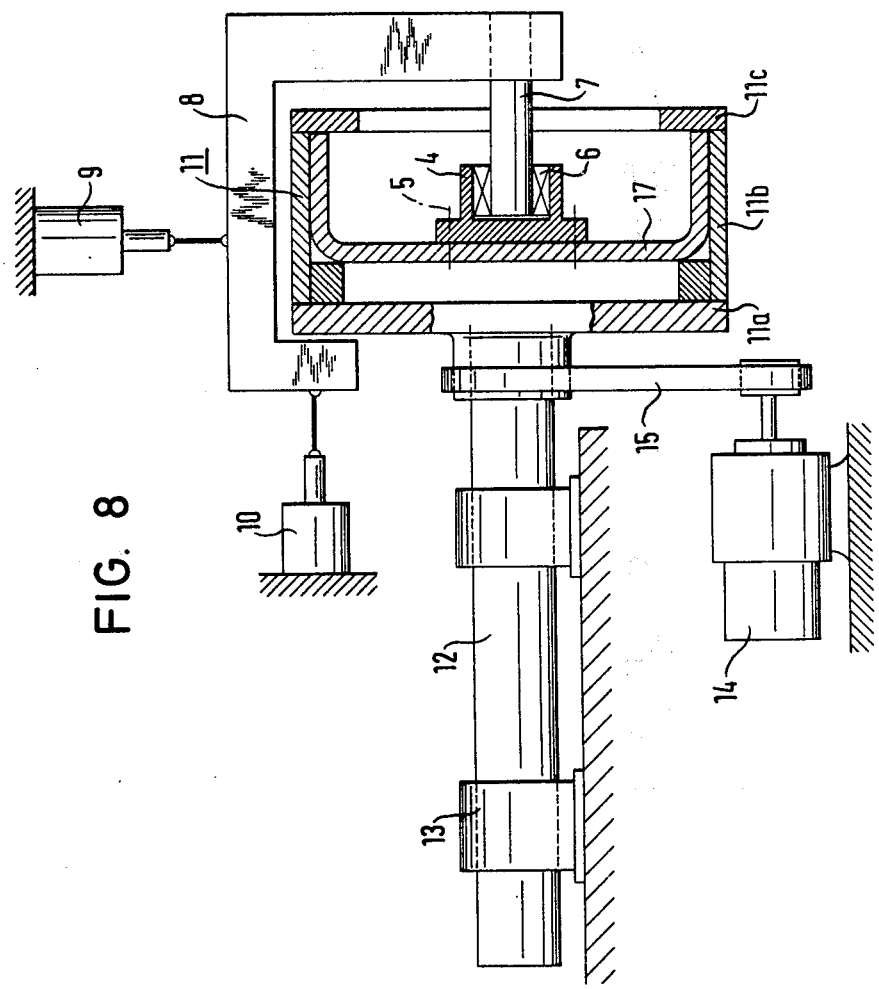

The testing of wheel hubs, bearings and bolts under conditions equivalent to actual operation may cause premature failure to the wheel unless it is of sufficient size to withstand the test conditions. It is often necessary in the known devices to make several replacements of the wheel used in such tests. However, using the present apparatus, a substitute wheel construction 17, such as shown in FIG. 8, may be used which has larger dimensions than the usual wheel and can be fastened to the load device 8 without a tire. The wheel periphery will thus make direct contact with the wheel contact device 11. Under this arrangement, the vertical and lateral forces are transmitted to the wheel through the wheel bolts 5 into the flange of the wheel hub 4 and the bearings 6 to provide deformations therein that are substantially the same as would occur with use of an original wheel and tire.

Some advantages of the invention evident from the foregoing description include a test apparatus having the capability of applying any desired load combination of vertical, lateral and longitudinal forces to a wheel, wheel hub, wheel bearing and wheel bolt to simulate the load conditions arising during actual road operation. The vertical and lateral forces can be applied independently of each other and the load conditions are predetermined and capable of control by automatic programming. Thus, the deformability of the wheel, the hub, the bearings and the bolts under test is equivalent to that occurring in actual operation. A further advantage is that the wheel, the hub, the wheel bearings and the bolts can be overloaded to reduce the overall test time by imposing a substantial and greater road condition on the wheel than would occur in actual operation. It has been found that a load five times greater than the static wheel load can be used without causing premature tire damage or failure. This is accomplished because the cylindrical drum diameter of the wheel contact device 11 is only slightly larger than the tire diameter. The load imposed on the tire under test is thus distributed over a greater peripheral area than would be affected under actual operating conditions. Therefore, there is less surface pressure and smaller lengthwise slippage than that occurring on a smooth road so that heating and tire wear are considerably reduced.

The introduction of the lateral forces as reaction forces by the contact rings 11d of the wheel contact device 11 also does not cause any significant tread wear in comparison with the lateral forces generated by camber or oblique running on an even road or a convex test drum. As a result of the formfitting engagement between the tire 1 and the contact rings 11d and the slight heating of the tire, constant and reproducable test conditions are assured using substantial lateral force magnitudes and test frequencies because no significant change of the coefficient of friction occurs between the tire 1 and the wheel contact device 11. Moreover, since the lateral force ($F_h$) is independent of the vertical ($F_v$) it can be readjusted and power-controlled by the servo-hydraulic cylinder 10.

Substantial cost savings result with the present apparatus since fewer tires are destroyed during test. In addition, the test apparatus does not cause ecological problems since it is not unduly noisy and does not produce excessively noxious odors. A further advantage is that the test apparatus will accommodate a substitute wheel construction to compensate for wheels with insufficient strength to tolerate overload when testing bearings and hubs. The test apparatus also permits testing of wheels in tandem arrangement under load conditions that produce unequal stresses on both wheels in simulation of actual load operation for trucks.

In view of the above, it will be seen that the several objects of the invention are achieved and other advantageous results attained.

As various changes could be made in the above constructions with departing from the scope of the invention, it is intended that all mater contained in the above description or shown in the accompanying drawings shall be interpreted as illustrative and not in a limiting sense.

We claim:

1. A device for testing vehicle wheels, wheel hubs, wheel bearings and wheel bolts under loading conditions resembling actual operation comprising a frame for holding the wheel to be tested on which a tire has been mounted, said frame including an axle upon which said wheel is rotatable, said axle having a normal position, wheel contact means surrounding said wheel for contact with a portion of the peripheral surface of said wheel through the tire mounted thereon, said wheel contact means being fixed to a rotatable shaft, and including means for rotating said shaft, force-imposing means for deflecting said frame to change the normal position of the axle to load said wheel against the surface of said wheel contact means a predetermined amount corresponding to the force imposed on said frame by said force-imposing means.

2. The device according to claim 1 wherein said means for deflecting said frame includes first deflection means for deflecting said frame in a radial direction substantially perpendicular to the normal position of said axle, and second deflection means for deflecting said frame in a lateral direction parallel to the normal position of said axle.

3. The device according to claim 2, wherein said wheel contact means includes annular ring members engagable with said wheel for imposing a lateral force on said wheel in response to deflection of said frame in said lateral direction.

4. The device according to claim 2 wherein said first and second deflection means are actuatable independently of each other to furnish separate predetermined deflections in said radial and lateral directions.

5. The device according to claim 4 wherein said first and second deflection means comprise hydraulic cylinders having respective movable elements drivingly secured to said frame for movement of said frame upon actuation of said cylinders.

6. The device according to claim 2 wherein said wheel contact means comprise an annual inner surface engagable with the periphery of said tire the amount of said surface to surface contact being increasable in correspondence with increases in the force magnitude imposed on said frame.

7. The device according to claim 6 wherein the inside diameter of said wheel contact means is equal to or slightly larger than the outer diameter of said inflated tire when not loaded by said wheel contact means.

8. The device according to claim 2 further including a wheel hub supportable on said axle and detachable securing means for securing said wheel hub to said wheel, such that said wheel hub is interchangeable with other of said wheel hubs being subject to test.

9. The device according to claim 8 wherein said detachable securing means are engagable with wheel hubs of different size and/or rigidity to secure different types of wheel hubs to said wheel for tests.

10. The device according to claim 8 further including said wheel bearings in said wheel hub for rolling engagement on said axle to test said bearings.

11. The device according to claim 2 wherein at least two wheels are mountable on said axle for simultaneous testing of said wheels in tandem arrangement.

12. The device according to claim 2 wherein said wheel is interchangeable with an oversized wheel or disc having an outer periphery of a size sufficient to make contact with said wheel contact means such that said frame load is transmitted directly to the outer periphery of said oversized wheel or disc from said wheel contact means in response to the deflection of said frame.

13. The device according to claim 12 further including a wheel hub supportable on said axle and detachable securing means for securing said wheel hub to said axle such that said wheel hub is interchangeable with other of said wheel hubs being subject to test.

14. The device according to claim 13 further including said wheel bearings in said hub for rolling engagement on said axle to test said bearings.

15. The device according to claim 14 wherein said brake arrangement comprises a disc brake and brake pads engagable with said disc.

16. The device according to claim 2 wherein a wheel brake arrangement is combined with said wheel.

17. The device according to claim 16 wherein said brake arrangement comprises a brake drum and brake shoes engagable wtih said brake drum.

18. Apparatus for testing wheels of vehicles, wheel hubs, wheel bearings and wheel bolts under operation-like conditions, comprising
    (a) mounting means for rotatably mounting a vehicle wheel;
    (b) a drum arranged around said vehicle wheel so that said wheel is brought into rolling engagement with the inner peripheral surface of said drum;
    (c) radial load applying means connected with said mounting means for applying a radial force to said mounting means, said radial force acting in the radial direction of said vehicle wheel;
    (d) axial load applying means connected with said mounting means for applying an axial force to said mounting means, said axial force acting in the axial direction of said vehicle wheel;
    (e) at least one ring arranged on said inner peripheral surface of said drum adjacent to the tread and flank of said wheel, said ring being tapered on the side facing said tread; and
    (f) means for rotating said drum.

* * * * *